United States Patent Office 2,864,815
Patented Dec. 16, 1958

2,864,815

METHOD OF PREPARING FORMAZANE DYESTUFFS

Herbert Ziegler, Baudour, Belgium, assignor to Société Carbochimique, Société Anonyme, Brussels, Belgium, a Belgian company No Drawing. Application September 14, 1953
Serial No. 380,140

Claims priority, application Belgium September 20, 1952

3 Claims. (Cl. 260—149)

It is known that the formazanes, which constitute a special group in the class of azo-dyes, are generally represented by the formula:

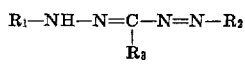

In this formula $R_1$ and $R_2$ represent cyclic radicals of an aromatic character, such as phenyl-, naphthyl-, and diphenyl-radicals, which may or may not be substituted.

$R_3$ is a monovalent radical which may be one of a wide variety of kinds and may for example be H, $NO_2$, CN, or a substituted or unsubstituted alkyl, acyl, or aryl group.

These formazane compounds are often of interest as dyes for dyeing animal, vegetable, or artificial fibres, or else as pigments, particularly when, as already described, $R_1$ and $R_2$ in the above formula represent cyclic radicals of an aromatic character one or both of which carry in the 2 position in relation to the end nitrogen atoms of the azohydrazonic chain, a functional group capable of participating in the formation of metallic complexes. These metallisable functional groups are well known and may be, inter alia, hydroxyl, carboxyl, or alkoxy groups.

Formazane compounds are used as such or in the form of their metallic complexes, which, as is known, may be prepared in the course of or subsequent to manufacture.

It is known that the usual method of preparation of formazane compounds consists in reacting diazo compounds with hydrazones obtained by condensation of hydrazines with aldehydes.

Thus, for example, the hydrazines, corresponding to the amines customarily used in the chemistry of azo-dyes, may be condensed with acetaldehyde, crotonaldehyde, benzaldehyde, and so on.

When $R_3$ in the above formula is a group such as, for example, the nitro, nitrile, or acyl groups, these formazanes may, as is known, also be obtained by the coupling of two molecules of diazotized amines with suitable coupling components possessing a sufficiently reactive methylene group. These coupling components may be, inter alia, nitromethane, acetone, cyanacetic acid, malonic acid, and benzoyl acetic acid.

When, on the other hand, it is desired to synthesize formazanes in which $R_3$ is an aromatic hydrocarbon radical, substituted or unsubstituted directly attached to the meso carbon atom, which formazanes in the form of their metal complex compounds are of greatest interest as dyestuffs, the only method utilised up to the present time is the coupling of a diazonium salt of an aromatic amine to a hydrazone obtained by condensation of an aromatic hydrazine with an aromatic aldehyde.

Thus, in order to prepare N-2-carboxyphenyl-N'-2'-hydroxyphenyl - ms - phenyl - formazane, benzaldehyde is condensed with 2-carboxyphenyl hydrazine and the diazo of o-aminophenol is coupled to the resulting hydrazone. The formazane:

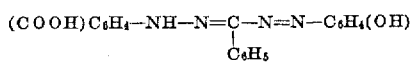

is thus obtained.

If, in the general formula of a formazane, we consider that $R_2$ is introduced by coupling of various diazonium salts, $R_1$ must then be included in the hydrazonic term and each new meaning attributed to $R_1$ implies the preparation of a new aromatic hydrazine.

The preparation of aromatic hydrazines often presents difficulties, and in particular the synthesis of the majority of the o-hydroxylated aryl-hydrazines is practically impossible.

These difficulties therefore greatly restrict the field of application of the method of preparation of formazanes from hydrazines.

It has been discovered that the hydrazine method can easily be avoided, and that meso-aryl formazanes can also be prepared by means of two successive couplings, by bringing into action two molecules of the same diazonium salt of an aromatic amine or two molecules of different diazonium salts of aromatic amines on a coupling component characterised by the presence in its molecule of a reactive methinic group and having the general structure:

In this formula, Ar represents a substituted or unsubstituted aromatic hydrocarbon radical, and X and Y are electron-attracting groupings, one of which (X) is replaced by the cation of the first diazonium salt ($R_1$—$N^{2+}$), and the other (Y) replaced, if necessary after saponification, by the cation of the second diazonium salt ($R_2$—$N^{2+}$).

In the present case, we understand by electron-attracting groupings the functions —CN and —CO—Z in which Z may signify —OH, $NH_2$, H, or alkyl, aryl, alkoxy, or esterified carboxylic radicals.

As non-limitative examples of coupling terms possessing this structure the following may be cited: phenyl - cyanacetic acid, ethyl phenyl - formyl - acetate, methyl m-tolyl-formyl acetate, ethyl alpha-naphthyl-formyl acetate, ethyl alpha-phenyl-aceto-acetate, diethyl phenyl-oxalyl acetate, ethyl phenyl-cyan-acetate, phenyl cyan-acetamide, phenyl-formyl-acetonitrile, alpha-phenyl-acetylo-acetonitrile, ethyl phenyl-cyan-pyruvate, ω-phenyl-ω-cyan-acetophenone.

By reacting a coupling agent of the structure defined above with one molecule of a diazotised aromatic amine selected from the amines commonly used in the chemistry of dyestuffs, a hydrazone of the general formula:

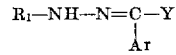

is obtained, where $R_1$ represents the radical of the aromatic amine utilised, Ar a substituted or unsubstituted aromatic hydrocarbon radical, and Y one of the above mentioned CN or COZ electron-attracting groups.

After saponification at Y, these hydrazones react easily with a second diazonium salt of an aromatic amine to yield formazanes. If we represent by $R_2$ the radical of the second aromatic amine selected, we obtain the formazane of the general structure:

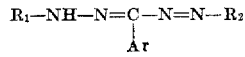

It has also been discovered that by the general method just described it is easily possible to prepare, with excellent yields, a particular and hitherto inaccessible class of meso-aryl formazane dyes characterised in that they possess groups hydroxylated at the ortho- and ortho'-positions in relation to the end nitrogen atoms of the azohydrazonic chain.

These formazanes are of the type:

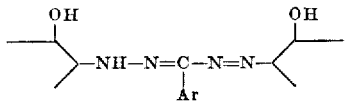

Hitherto in the class of these dihydroxylated formazanes only compounds carrying on the meso carbon monovalent radicals other than aryl groups were known.

It has now been observed that the new o-o'-dihydroxymeso-aryl formazanes of the present invention, particularly in the form of their metal complex compounds, are characterised by exceptional tinctorial power.

These o-o'-dihydroxylated formazane dyestuffs dye particularly easily wool, natural silk, and nylon in a neutral or slightly acid bath, and result in shades which are distinguished by their brightness and fastness far superior to those of known formazane dyestuffs.

The following examples are given for the purpose of illustrating the invention. Parts are given by weight.

*Example 1*

18.1 parts of the sodium salt of alpha-phenyl-acetylo-acetonitrile are dissolved in 400 parts of water and 240 parts of ethyl alcohol.

At 5 to 10° C., 8 parts of sodium carbonate are added in the form of an aqueous solution of 106 grams per litre, and the diazonium salt obtained by diazotization of 9.3 parts of aniline. The hydrazone formed, precipitating in the form of yellow flakes, is filtered.

22.1 parts of said hydrazone are taken up in 65 parts of ethyl alcohol, 60 parts of water, and 47 parts of caustic soda of 36° Bé. The mixture is heated to boiling point for 5 hours, and filtered. The filtrate is diluted with 450 parts of ethyl alcohol. At 5 to 10° C., 17 parts of sodium carbonate are added in the form of an aqueous solution of 106 grams per litre, and the diazonium salt obtained by diazotization of 17.2 parts of 2-nitro-4-chloro-aniline. The N-phenyl-N'-(2'-nitro-4'-chloro-phenyl)-ms-phenyl-formazane formed is filtered.

After drying, a red powder is obtained which shows a light red colouration in an ethyl alcohol medium and a purplish-blue colouration in concentrated sulfuric acid.

*Example 2*

A solution in methyl alcohol of the sodium salt of 2-phenyl-indanedione-(1,3-) is prepared by mixing in the hot state 22.2 parts of benzalphthalide in solution in 160 parts of methyl alcohol, and 3 parts of sodium in solution in 80 parts of methyl alcohol. After having diluted with 240 parts of methyl alcohol, there are added at 20° C. 3 parts of caustic soda of 36° Bé. and the diazonium salt obtained by diazotization of 17.3 parts of sulphanilic acid. On completion of the coupling, the mixture is heated for one hour at boiling point in the presence of 400 parts of caustic soda of 36° Bé. After filtration of insoluble matter, the mixture is diluted with about 400 parts of water, 200 parts of hydrochloric acid of 19° Bé. are added, and at 5° C. a solution of diazonium salt, prepared by diazotization of 15.1 parts of 5-nitro-2-amino-anisol, is introduced. On completion of the coupling, the mixture is neutralised with hydrochloric acid, heated to 70° C., and allowed to cool. The N-(4-sulpho-phenyl)-N'-(2'-methoxy-4'-nitro-phenyl)-ms-phenyl-formazane formed is precipitated and is filtered. After drying, a purplish-blue powder is obtained, which shows a purplish-red colouration in water and a purplish-blue colouration in concentrated sulphuric acid.

*Example 3*

17.8 parts of alpha-phenyl-aceto-acetic acid are dissolved in 900 parts of water by means of 13.3 parts of caustic soda of 36° Bé. at 0 to 5° C.; 385 parts of caustic soda of 36° Bé. are added, and the diazonium salt obtained by diazotization of 37.8 parts of 4-sulpho-2-amino phenol. The N-N'-di(2 - hydroxy - 5 - sulphophenyl)-meso-phenyl formazane is precipitated by the addition of 300 parts of hydrochloric acid of 19° Bé. and 420 parts of NaCl, and filtered.

After drying, a dark reddish brown powder is obtained, which dyes wool by coppering on the fibre a bright blue.

The isolated formazane gives in an ammoniacal medium a copper complex likewise dyeing wool a bright blue.

*Example 4*

20.6 parts of ethyl alpha-phenyl-aceto-acetate are dissolved in 300 parts of ethyl alcohol at 10° C., 23 parts of caustic soda of 36° Bé., followed by the diazonium salt obtained by diazotization of 23.4 parts of 4-sulpho-6-nitro-2-amino phenol. On completion of the coupling, the hydrazone is precipitated in the form of orange-coloured crystals by the addition of 26 parts of hydrochloric acid of 19° Bé. and 50 parts of NaCl at 40° C. After cooling, the mixture is filtered.

41 parts of the hydrazone are taken up in 400 parts of water and 26.5 parts of caustic soda of 36° Bé. The mixture is heated to boiling point for 10 minutes and neutralised by 12 parts of hydrochloric acid of 19° Bé. At atmospheric temperature, a solution of 25 parts of crystallised copper sulphate in 100 parts of water, 8 parts of sodium carbonate in the form of an aqueous solution of 106 grams per litre, and the diazonium salt obtained by diazotization of 18.9 parts of 4-nitro-6-chloro-2-amino-phenol are added. The mixture is kept for a further hour with stirring, heated to 70° C., allowed to cool, and the copper complex of N-(2-hydroxy-3-nitro-5-sulpho-phenyl)-N'-(2'-hydroxy-3'-chloro-5'-nitrophenyl) - meso-phenyl-formazane is filtered. After drying, a black powder is obtained which dyes wool, natural silk, and nylon a bright greenish blue.

*Example 5*

To a solution of 21.4 parts of the sodium salt of methyl m-tolyl-formyl acetate in 110 parts of water there are added at 15° C. 12 parts of sodium carbonate in the form of an aqueous solution of 106 grams per litre, and the diazonium salt obtained by diazotization of 23.4 parts of 4-sulpho-6-nitro-2-amino phenol. On completion of the coupling, the hydrazone is separated in the form of light orange-coloured crystals by the addition of 35 parts of hydrochloric acid of 19° Bé., in the hot state, and cold filtration.

41 parts of the hydrazone are taken up in 400 parts of water and 26.5 parts of caustic soda of 36° Bé. The mixture is heated to boiling point for 10 minutes and neutralised by 10 parts of hydrochloric acid of 19° Bé. At ordinary temperature, there are added a solution of 25 parts of crystallised copper sulphate in 100 parts of water, 9 parts of sodium carbonate in the form of an aqueous solution of 106 grams per litre, and the diazonium salt obtained by diazotization of 15.4 parts of 4-nitro-2-amino-phenol. On completion of the coupling, the mixture is heated to 80° C., allowed to cool, and the copper complex of N-(2-hydroxy-3-nitro-5-sulphophenyl)-N'-(2'-hydroxy-5'-nitrophenyl)-meso-tolyl formazane is filtered.

After drying, a dark powder is obtained which dyes wool, natural silk, and nylon an intense bright greenish blue.

*Example 6*

To a solution of 21.4 parts of the sodium salt of ethyl alpha-phenyl-formyl acetate in 110 parts of water there are added, at 5–10° C., 11 parts of sodium carbonate in the form of an aqueous solution of 106 grams per litre, and the diazonium salt obtained by diazotization of 19.9 parts of picramic acid. Stirring is maintained for three hours more, the mixture is heated to 80° C., and the hydrazone formed is filtered in the cold state.

37.5 parts of the hydrazone are taken up in 400 parts of water and 26.5 parts of caustic soda of 36° Bé. The mixture is heated to boiling point for 10 minutes, filtered, neutralised by 10 parts of hydrochloric acid of 19° Bé, and diluted with 100 parts of water and 50 parts of ethyl alcohol. At 5–10° C., there is added a solution of 26.3 parts of crystallised nickel sulphate in 50 parts of water, 15 parts of sodium bicarbonate, and the diazonium salt obtained by diazotization of 18.9 parts of 4-sulpho-2-aminophenol. Stirring is maintained for a further 12 hours, the mixture is heated to 80° C., allowed to cool, and the nickel complex of N-(2-hydroxy-3,5-dinitrophenyl)-N'-(2'-hydroxy-5'-sulphophenyl) - meso - phenyl formazane is filtered. After drying, a black powder is obtained which dyes wool, natural silk, and nylon a reddish brown.

*Example 7*

To a solution of 28.6 parts of the sodium salt of diethyl phenyl-oxalyl acetate in 350 parts of water there are added, at 15° C., 26.5 parts of caustic soda of 36° Bé. and the diazonium salt obtained by diazotization of 23.4 parts of 4-sulpho-6-nitro-2-aminophenol. After stirring for 30 minutes, the hydrazone is precipitated in the form of light orange-coloured crystals by the addition of 37 parts of hydrochloric acid of 19° Bé., heating, and cooling. It is then filtered.

41 parts of the hydrazone are taken up in 400 parts of water and 26.5 parts of caustic soda of 36° Bé. The mixture is heated to boiling point for 10 minutes and neutralised with 12 parts of hydrochloric acid of 19° Bé. At 15° C., there are added a solution of 25 parts of crystallised copper sulphate in 100 parts of water and the diazonium salt obtained by diazotization of 19.9 parts of picramic acid. Stirring is maintained for 10 hours, the copper complex of N - (2 - hydroxy - 3 - nitro - 5 - sulphophenyl)-N'-(2'-hydroxy-3',5'-dinitrophenyl)-meso-phenyl formazane is separated by the addition of 50 parts of NaCl, and filtered.

After drying, a black powder is obtained which dyes wool, natural silk, and nylon an intense bright green.

*Example 8*

0.25 part of the dyestuff of Example 7 is dissolved in 1 litre of water at 40° C., and to this bath there are added 2.5 parts of crystallised sodium sulphate and 1 part of acetic acid (30%).

At about 40° C., 25 parts of wool are introduced and temperature is raised to boiling point in three quarters of an hour.

Dyeing is carried out for half to three quarters of an hour at that temperature.

The material, after rinsing and drying, is dyed a green shade.

I claim:

1. The method of producing metal complexes of meso-aryl formazane dyestuffs selected from the group consisting of copper and nickel complexes of meso-aryl formazanes having the structural formula

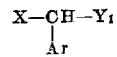

wherein Ar is selected from the group consisting of phenyl and lower alkyl-substituted phenyl, and $R_1$ and $R_2$ are substituted o-hydroxyphenyl groups selected from the group consisting of o-hydroxy-nitrophenyl, o-hydroxy-sulfophenyl, o-hydroxy-halonitrophenyl, o-hydroxy-nitrosulfophenyl and o-hydroxy-dinitrophenyl, which comprises coupling the diazonium salt of an aromatic amine having the structural formula

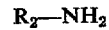

wherein $R_1$ has the meaning above indicated, with a compound having the structural formula.

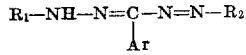

wherein Ar has the meaning above indicated, X is selected from the group consisting of —COOH, —CONH$_2$, —COO.alkyl, —CHO, —CO.alkyl, —CO.aryl and —CO.COO.alkyl, and $Y_1$ is a saponifiable group selected from the group consisting of —CN and —COO.alkyl, saponifying group $Y_1$ of the resulting hydrazone compound and coupling said saponified hydrazone compound in the presence of a metal salt selected from the group consisting of copper salts and nickel salts with an additional mol of the diazonium salt of an aromatic amine having the formula

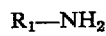

wherein $R_2$ has the meaning above indicated, to exchange the saponified group $Y_1$ for the diazonium radical of said last-mentioned diazonium salt.

2. The method of producing nickel complexes of meso-aryl formazanes having the structural formula

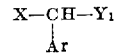

wherein Ar is selected from the group consisting of phenyl and lower alkyl-substituted phenyl, and $R_1$ and $R_2$ are substituted o-hydroxyphenyl groups selected from the group consisting of o-hydroxy-nitrophenyl, o-hydroxy-sulfophenyl, o-hydroxy-halonitrophenyl, o-hydroxy-nitrosulfophenyl and o-hydroxy-dinitrophenyl, which comprises coupling the diazonium salt of an aromatic amine having the structural formula $R_1$—NH$_2$ wherein $R_1$ has the meaning above indicated, with a compound having the structural formula

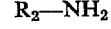

wherein Ar has the meaning above indicated, X is selected from the group consisting of —COOH, —CONH$_2$, —COO.alkyl, —CHO, —CO.alkyl, —CO.aryl and —CO.COO.alkyl, and $Y_1$ is a saponifiable group selected from the group consisting of —CN and —COO.alkyl, saponifying group $Y_1$ of the resulting hydrazone compound and coupling said saponified hydrazone compound in the presence of a nickel salt with an additional mol of the diazonium salt of an aromatic amine having the structural formula $R_2$—NH$_2$ wherein $R_2$ has the meaning above indicated, to exchange the saponified group $Y_1$ for the diazonium radical of said last-mentioned diazonium salt.

3. The method of producing copper complexes of meso-aryl formazane dyestuffs having the structural formula

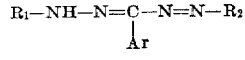

wherein Ar is selected from the group consisting of phenyl and lower alkyl-substituted phenyl, and $R_1$ and $R_2$ are substituted o-hydroxyphenyl groups selected from the group consisting of o-hydroxy-nitrophenyl, o-hydroxy-sulfophenyl, o-hydroxy-halonitrophenyl, o-hydroxy-nitrosulfophenyl and o-hydroxy-dinitrophenyl, which comprises coupling the diazonium salt of an aromatic amine having the structural formula $R_1$—NH$_2$ wherein $R_1$ has the meaning above indicated, with a compound having the structural formula

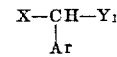

wherein Ar has the meaning above indicated, X is selected from the group consisting of —COOH, —CONH$_2$, —COO.alkyl, —CHO, —CO.alkyl, —CO.aryl and —CO.COO.alkyl, and Y$_1$ is a saponifiable group selected from the group consisting of —CN and —COO.alkyl, saponifying group Y$_1$ of the resulting hydrazone compound and coupling said saponified hydrazone compound in the presence of a copper salt with an additional mol of the diazonium salt of an aromatic amine having the formula $$R_2\text{—}NH_2$$

wherein R$_2$ has the meaning above indicated, to exchange the saponified group Y$_1$ for the diazonium radical of said last-mentioned diazonium salt.

References Cited in the file of this patent

UNITED STATES PATENTS

| | | |
|---|---|---|
| 2,383,134 | Lacey | Aug. 21, 1945 |
| 2,594,803 | Riat | Apr. 29, 1952 |
| 2,662,074 | Brooks | Dec. 8, 1953 |
| 2,662,075 | Brooks | Dec. 8, 1953 |
| 2,662,807 | Wegmann | Dec. 15, 1953 |
| 2,688,040 | Adams | Aug. 31, 1954 |

OTHER REFERENCES

Saunders: The Aromatic Diazo Compounds, 2nd ed., 1949, pages 214, 215.